(12) United States Patent
Irvine

(10) Patent No.: US 8,590,594 B2
(45) Date of Patent: Nov. 26, 2013

(54) UNIVERSAL JOINT AND METHOD FOR MANUFACTURING SAME

(75) Inventor: Robert J. Irvine, Highland, MI (US)

(73) Assignee: Panther Machine, Inc., Wixom, MI (US)

( * ) Notice: Subject to any disclaimer, the term of this patent is extended or adjusted under 35 U.S.C. 154(b) by 0 days.

(21) Appl. No.: 13/334,733

(22) Filed: Dec. 22, 2011

(65) Prior Publication Data

US 2013/0160965 A1    Jun. 27, 2013

(51) Int. Cl.
*B22D 19/08* (2006.01)
(52) U.S. Cl.
USPC .............. 164/100; 164/98; 164/112; 464/128
(58) Field of Classification Search
USPC ............. 464/128, 134, 136; 403/269; 164/98, 164/100, 111, 112
See application file for complete search history.

(56) References Cited

U.S. PATENT DOCUMENTS

| | | | | |
|---|---|---|---|---|
| 3,313,127 A | * | 4/1967 | Piatti | 464/128 |
| 3,650,123 A | * | 3/1972 | Sheppard, Jr. | |
| 4,190,479 A | * | 2/1980 | Smith | 403/269 X |
| 6,893,350 B2 | * | 5/2005 | Menosky et al. | 464/136 X |
| 7,581,580 B2 | * | 9/2009 | Lin et al. | 164/98 |

FOREIGN PATENT DOCUMENTS

JP        61-201926 A  *  9/1986 .................... 464/136

* cited by examiner

*Primary Examiner* — Gregory Binda
(74) *Attorney, Agent, or Firm* — Gifford, Krass, Sprinkle, Anderson & Citkowski, P.C.

(57) ABSTRACT

A universal joint having a hub formed by molding a material around four stub axles which are arranged so that a first and second stub axle are axially aligned and a third and fourth stub axle are axially aligned. Furthermore, the axes of the first and second stub axles are perpendicular to and coplanar with the axes of the third and fourth stub axles. A bearing is positioned around each stub axle. A first yoke is then molded around two aligned stub axle bearings and an end of a first axle while, similarly, a second axle is molded around the bearings on the other pair of stub axles and an end of a second axle.

6 Claims, 3 Drawing Sheets

UNIVERSAL JOINT AND METHOD FOR MANUFACTURING SAME

BACKGROUND OF THE INVENTION

I. Field of the Invention

The present invention relates generally to manufacturing methods and, more particularly, to a method for manufacturing a universal joint using molding processes.

II. Description of Related Art

There are many different types of universal joints. Such universal joints typically drivingly connect a first and second axle together, but permit the axles to articulate relative to each other. For example, a universal joint is typically employed to drivingly connect an engine to the drive axles of small vehicles, such as golf carts.

The previously known universal joints typically comprise a hub having four axles extending outwardly from it. One end of a first elongated axle is then drivingly connected to two axially aligned axles by a yoke. Similarly, a second axle has one end connected by a second yoke to the other two stub axles. By this construction, rotation of one shaft results in rotation of the other shaft. However, the yokes together with the hub enable the axles to articulate relative to each other.

The previously known universal joints typically used forged or machined yokes in order to connect the hub to the respective axles. Likewise, the hub was also machined so that the overall manufacturing expense to construct both the yokes and the hub was expensive and significantly added to the overall cost of the universal joint. Furthermore, since the yokes and the hub were separately manufactured, it was oftentimes necessary to construct the yoke as a multi-piece construction in order to permit assembly of the yokes to the hub. This also increased the overall cost of the universal joint.

SUMMARY OF THE PRESENT INVENTION

The present invention provides a universal joint and method for manufacturing the universal joint which significantly simplifies and reduces the manufacturing time and cost necessary to manufacture the entire universal joint.

In brief, in the present invention, four stub axles are placed in a mold chamber so that a first and second stub axle are coaxially aligned with each other and extend outwardly from the center of a mold cavity. Similarly, a third and fourth stub axle are also positioned within the mold chamber and are axially aligned with each other so that they extend outwardly from the center of the mold chamber. Furthermore, the axes of the first two stub axles and the axes of the second pair of stub axles are coplanar, but perpendicular relative to each other.

A hub is then molded around the inner ends of all four axles, preferably by injection molding of zinc. During that same molding process, four bearings are also molded which are then separated from the hub.

Two bearings are then placed over two aligned stub axles and placed into a second mold cavity. One end of an elongated axle is also positioned within the second mold cavity. The second mold cavity is then injection molded, preferably with zinc, to form a yoke which pivotally connects the axle to two aligned stub axles.

Two bearings are then placed on the other remaining two stub axles and the hub is placed into the second mold cavity. One end of an axle is also placed within the mold cavity which is then injected with the molding material, preferably zinc. In doing so, the molding material forms a U-shaped yoke interconnecting the second pair of stub axles with the end of the second axle and completing the universal joint.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
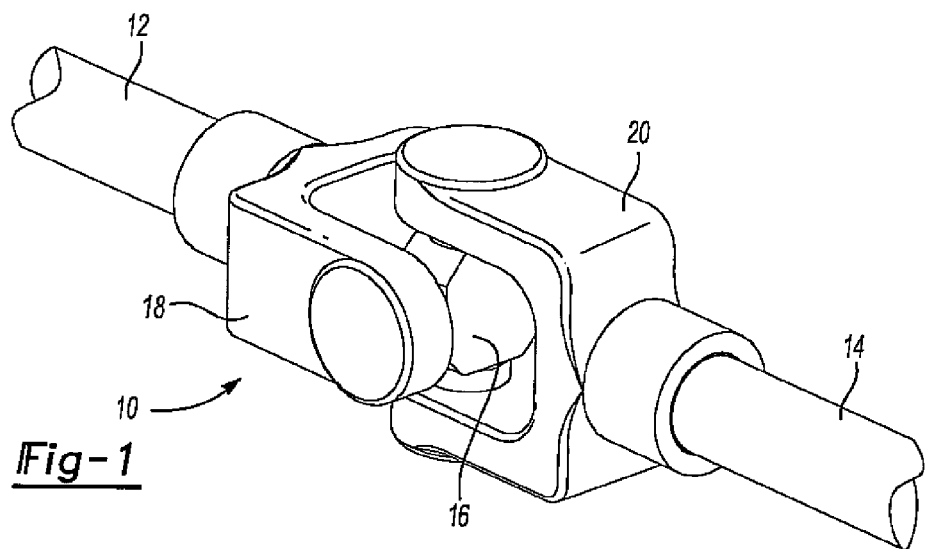
FIG. 1 is an elevational fragmentary view illustrating a universal joint manufactured in accordance with the present invention.

With reference first to FIG. 1, a universal joint 10 according to the present invention is illustrated. The universal joint 10 interconnects a first axle 12 with a second axle 14 so that the axles 12 and 14 are drivingly rotatably connected together. However, the universal joint 10 permits the axles 12 and 14 to pivot or articulate relative to each other. Such articulation might occur, for example, if the universal joint 10 were used in the drive transmission between the engine and the drive wheels of a small vehicle, such as a golf cart.

Still referring to FIG. 1, the universal joint 10 includes a central hub 16. A pair of U-shaped yokes 18 and 20 are both fixedly attached to the axles 12 and 14, respectively, but pivotally mounted to the hub 16. The actual pivotal connection between the yokes 18 and 20 and the hub 16, as well as the fixed connection between the axles 12 and 14 and the yokes 18 and 20, respectively, will be subsequently described in greater detail.

Figure 2:
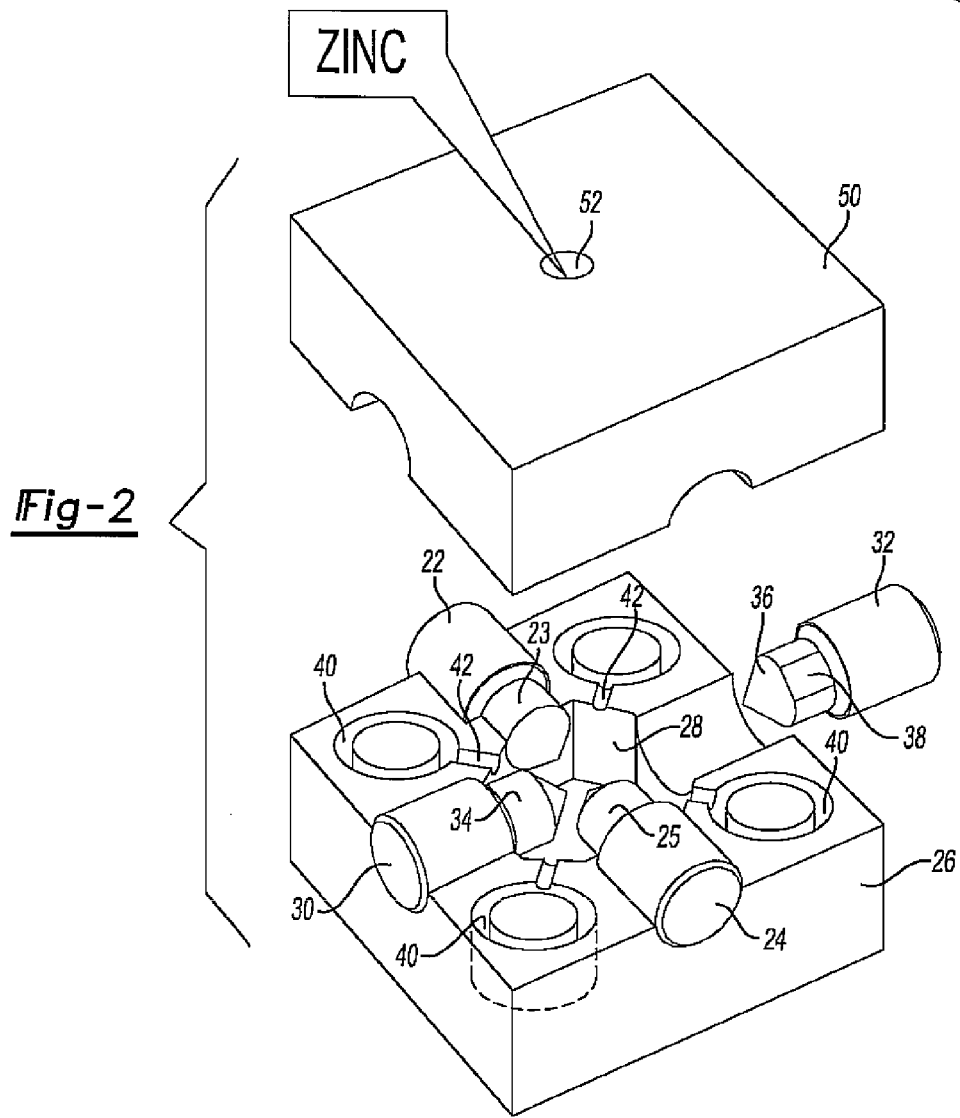
FIG. 2 is an exploded view illustrating one of the manufacturing steps to construct the universal joint.

With reference now to FIG. 2, in order to construct the universal joint 10 of the present invention, a first and second stub axle 22 and 24 are placed within a bottom mold 26 having a mold cavity 28 so that at least an inner end of each stub axle 22 and 24 is positioned within the mold cavity 28. Furthermore, the stub axles 22 and 24 extend outwardly from the center of the mold cavity 28 and are coaxially aligned with each other.

Similarly, a third and fourth stub axle 30 and 32, respectively, are also positioned within the mold 26 so that an inner end 34 of the third stub axle 30 and an inner end 36 of the fourth stub axle 32 are positioned within the mold cavity 28. Like the first and second stub axles 22 and 24, the stub axles 30 and 32 extend outwardly from the mold chamber 28 and are coaxially aligned with each other. Furthermore, the axes of the first and second stub axles 22 and 24 and the axes of the third and fourth stub axles 30 and 32 lie in the same plane, but are perpendicular relative to each other.

Each stub axle 22, 24, 30 and 32 is preferably made from a hard material, such as steel. Furthermore, although four stub axles 22, 24, 30 and 32 are illustrated in FIG. 2, it will be understood that the stub axles 22 and 24, or the stub axles 30 and 32, may be of a one piece construction. Indeed, all four stub axles 22, 24, 30 and 32 may be of a one piece construction. Each inner end 23, 25, 34 and 36 of the stub axles 22, 24, 30 and 32 preferably includes a noncircular portion, such as a flat 38 or a knurled surface.

Still referring to FIG. 2, the bottom mold 26 also preferably includes four bushing or bearing mold chambers 40 (hereafter collectively referred to as "bearing mold chamber") which are cup shaped, i.e. having a cylindrical inner diameter and closed at one end. Each bearing mold chamber 40, furthermore, is fluidly connected to the mold chamber 28 by a sprue 42.

Figure 3:
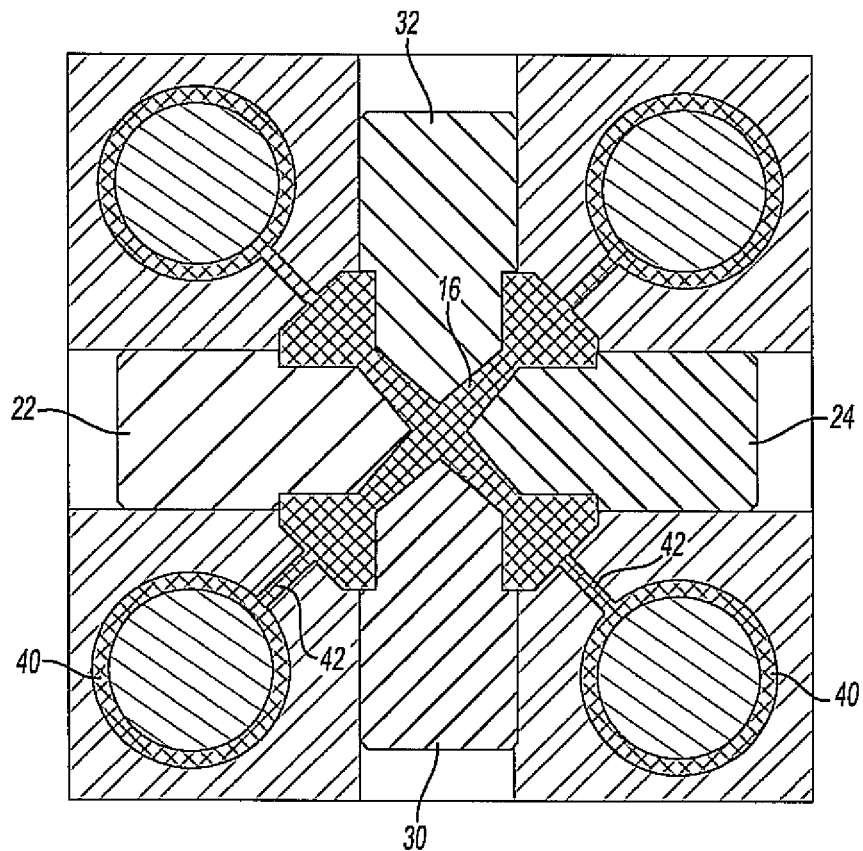
FIG. 3 is a sectional view illustrating a further step in the manufacture of the universal joint.

With reference now to FIGS. 2 and 3, a top mold 50 is then positioned over the bottom mold 26 to complete the mold chamber 28 as well as the bearing mold chambers 40. A molding material is then injected, preferably by fluid injection, through a sprue 52 (FIG. 2) into the mold chamber 28. As best shown in FIG. 3, the injected molding material forms the hub 16 which partially encompasses the inner ends of all four stub axles 22, 24, 30 and 32 thus locking the four stub axles to the hub 16. Although any conventional molding material can be used, preferably the molding material comprises zinc.

Figure 4:
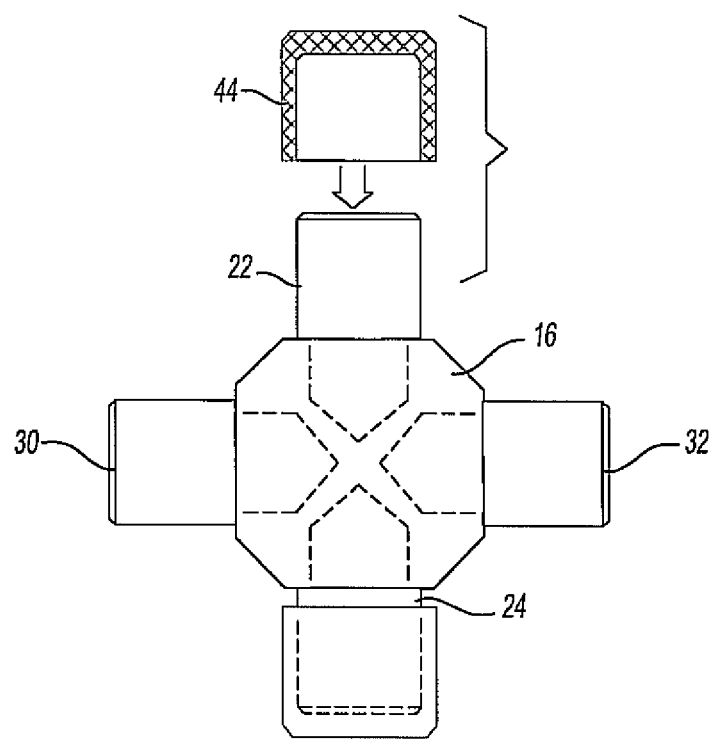
FIG. 4 is a partial fragmentary view illustrating a still further step in manufacturing the universal joint.

Still referring to FIG. 3, upon the injection of the molding material into the molding cavity 28, the molding material also flows through the sprues 42 and into the molding chambers 40 to form four bearings 44 (FIG. 4).

After the molding material has set in the mold chamber 28 and bearing mold chambers 40, the hub 16 together with the attached stub axles and bearings 44 are removed from the mold. The bushings or bearings 44 (hereafter collectively referred to as "bearings") are then separated from the hub and the material in the sprues 42 is removed in any conventional way, such as by grinding.

With reference now to FIG. 4, two of the bearings 44 are then positioned over the first and second stub axles 22 and 24. It will be understood, furthermore, that the inside diameter of the bearings 44 is slightly larger than the outside diameter of the stub axles 22 and 24. As such, free rotation, but without excessive slop, is obtained between the bearings 44 and stub axles 22 and 24.

Figure 5:
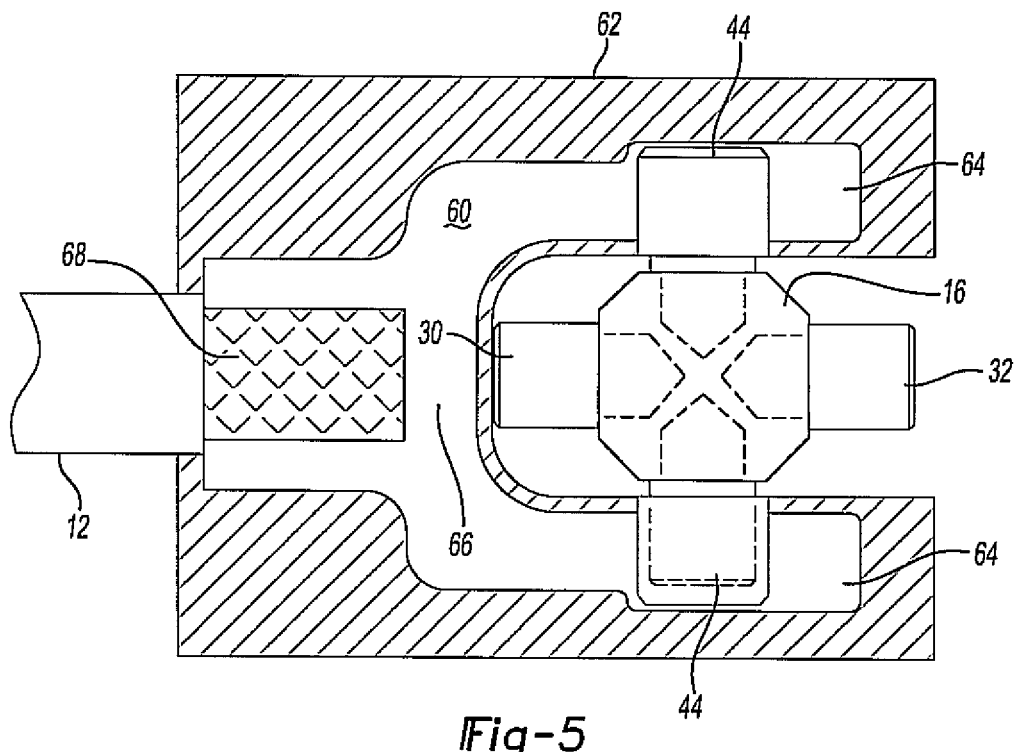
FIG. 5 is a view illustrating the step just prior to the manufacture of the yoke.

With reference now to FIG. 5, at least a portion of the bearings 44 is then placed within a mold chamber 60 of a second mold 62. This mold chamber 60, furthermore, includes a U-shaped portion having spaced apart legs 64 in which the bearings 44 are positioned as well as a base 66 which joins the legs 64. One end 68 of the axle 12 is then positioned within the mold chamber 60 at the base 66. Furthermore, the axle 12 is oriented so that it extends perpendicularly outwardly from the axis of the two bearings 44. In addition, the end 68 of the axle 12 is preferably knurled or otherwise roughened or noncircular.

Figure 6:
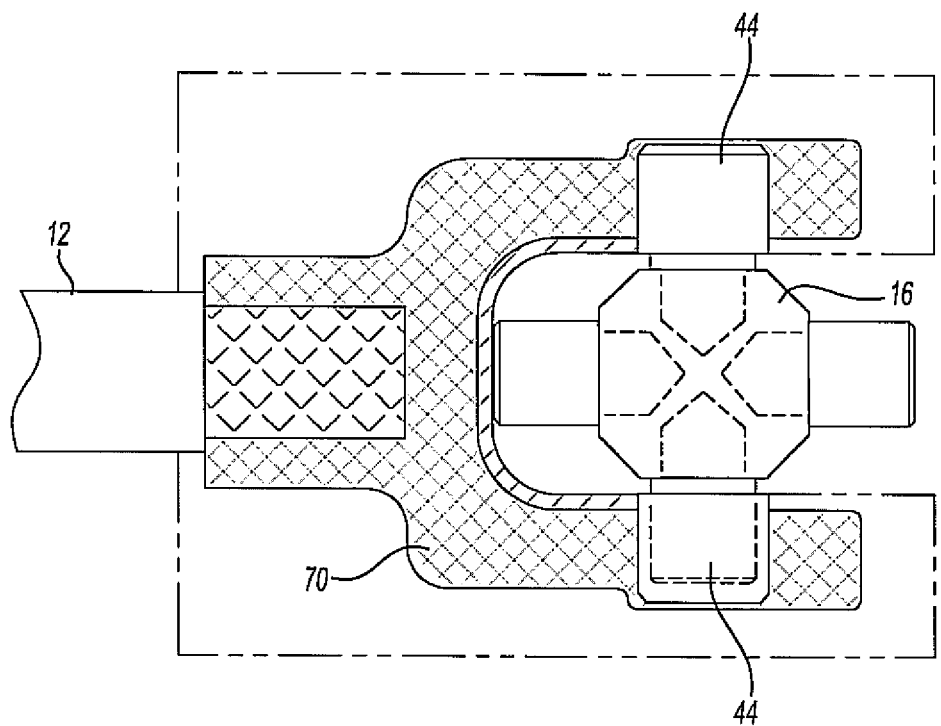
FIG. 6 is a view similar to FIG. 5, but illustrating the present invention following molding the yoke and drive axle.

With reference now to FIG. 6, with the hub 16 and attached bearings 44 positioned within the second mold 62 and the axle 12 likewise positioned with its end 68 in the mold cavity 60, the mold cavity 60 is then filled, preferably by injection molding, with a molding material 70, such as zinc. This molding material 70 thus forms the yoke 18 (FIG. 1) which joins the end 68 of the axle 12 to the two bearings 44 and thus to the hub 16. The hub 16, however, may freely rotate about the axes of the bearings 44.

After the molding material has set, the axle 12 with its attached hub 16 is then removed from the second mold 60. The above process is then repeated for the other two stub axles 30 and 32 and the other axle 14. In other words, the remaining two bearings 44 are first positioned over the stub axles 30 and 32 and those bearings are then positioned within the leg 64 of the mold chamber 60. One end of the other axle 14 is then positioned in the same fashion as the axle 12 illustrated in FIG. 5 and the mold chamber 60 is again filled with the molding material, preferably zinc. In doing so, the second yoke 20 (FIG. 1) is formed which joins the second axle 14 to the hub 16 through the bearings 44 and stub axles 30 and 32, thus completing the universal joint 10.

Unlike the previously known universal joints, since the yokes 18 and 20 (FIG. 1) are formed by the molding operation and integrally joined with the hub 16 through the bearings and stub axles, the yokes 18 and 20 may be of a one piece construction. Furthermore, the molding operation is not only simpler and quicker than the previously known methods for machining the yokes, but is also significantly less expensive in both material and other manufacturing costs.

Having described my invention, many modifications thereto will become apparent to those skilled in the art to which it pertains without deviation from the spirit of the invention as defined by the scope of the appended claims.

I claim:

1. A method for manufacturing a universal joint comprising the steps of:
    a) placing four stub axles in a mold chamber so that two stub axles are aligned with each other and extend outwardly from a center of the mold chamber and so that the other two stub axles are aligned with each other and extend outwardly from a center of the mold chamber in a direction coplanar with but perpendicular to the first two stub axles,
    b) molding a hub around the inner ends of all four stub axles,
    c) placing a bearing over two aligned stub axles,
    d) placing said two bearings on said hub in a second mold chamber,
    e) placing an end of an axle in said second mold chamber,
    f) molding a yoke around said two bearings and said end of said axle,
    g) repeating steps c)-f) with the other two stub axles and a second axle.

2. The method as defined in claim 1 and comprising the step of simultaneously molding four bearings during said hub molding step.

3. The method as defined in claim 1 wherein said end of said axle is knurled.

4. The method as defined in claim 1 wherein said hub molding step comprises the step of injection molding said hub.

5. The method as defined in claim 1 wherein said hub comprises zinc.

6. The method as defined in claim 1 wherein said yoke comprises zinc.

* * * * *